United States Patent [19]

Cox

[11] Patent Number: 4,762,181
[45] Date of Patent: Aug. 9, 1988

[54] MINIMUM TILLAGE IMPLEMENT

[75] Inventor: Randal A. Cox, Van Wert, Iowa

[73] Assignee: Cox, Inc., Van Meter, Iowa

[21] Appl. No.: 10,383

[22] Filed: Feb. 3, 1987

[51] Int. Cl.$^4$ .................. A01B 13/08; A01B 49/06; A01B 49/02

[52] U.S. Cl. .................. 172/196; 172/413; 172/166; 172/572; 111/52

[58] Field of Search .............. 172/196, 413, 166, 395, 172/421, 572, 573; 111/52, 85

[56] References Cited

U.S. PATENT DOCUMENTS

| | | | |
|---|---|---|---|
| 2,734,439 | 2/1956 | Padrick | 111/52 |
| 3,128,833 | 4/1964 | Johnson | 111/85 |
| 3,679,224 | 7/1972 | Hatcher | 172/421 |
| 3,870,107 | 3/1975 | Orthman | 172/421 |
| 3,924,694 | 12/1975 | Baughman | 172/413 |
| 4,055,126 | 10/1977 | Brown | 111/85 |
| 4,187,916 | 2/1980 | Harden | 172/166 |
| 4,213,408 | 7/1980 | West | 111/52 |
| 4,230,054 | 10/1980 | Hatcher | 111/85 |
| 4,524,837 | 6/1985 | Harden | 172/196 |
| 4,601,248 | 7/1986 | Beasley | 172/196 |
| 4,624,197 | 11/1986 | Drake | 111/52 |
| 4,628,840 | 12/1986 | Jacobson | 172/572 |

Primary Examiner—Richard J. Johnson
Attorney, Agent, or Firm—Zarley, McKee, Thomte, Voorhees & Sease

[57] ABSTRACT

A pull type minimum tillage implement includes a closed rectangular frame having a forward tool bar, intermediate tool bar and rear tool bar. The ground-working tools travel directly over each previous crop row and include a forward coulter mounted on the forward tool bar followed by a subshank and disk hiller mounted on the intermediate tool bar. A mounted planter may be connected to the rear tool bar while a drawn planter is connected under the rear tool bar to the intermediate tool bar. A pair of depth gauge and support wheel assemblies are provided directly over a pair of rows and include spaced apart frame members extending between the three tool bars with a ground wheel pivot arm positioned therebetween and pivotally connected to a bracket mounted on the front tool bar. A hydraulic cylinder pivots the frame about an axis through the forward end of the implement frame tongue thereby raising the rear end of the implement frame carrying with it the ground-working tools.

20 Claims, 4 Drawing Sheets

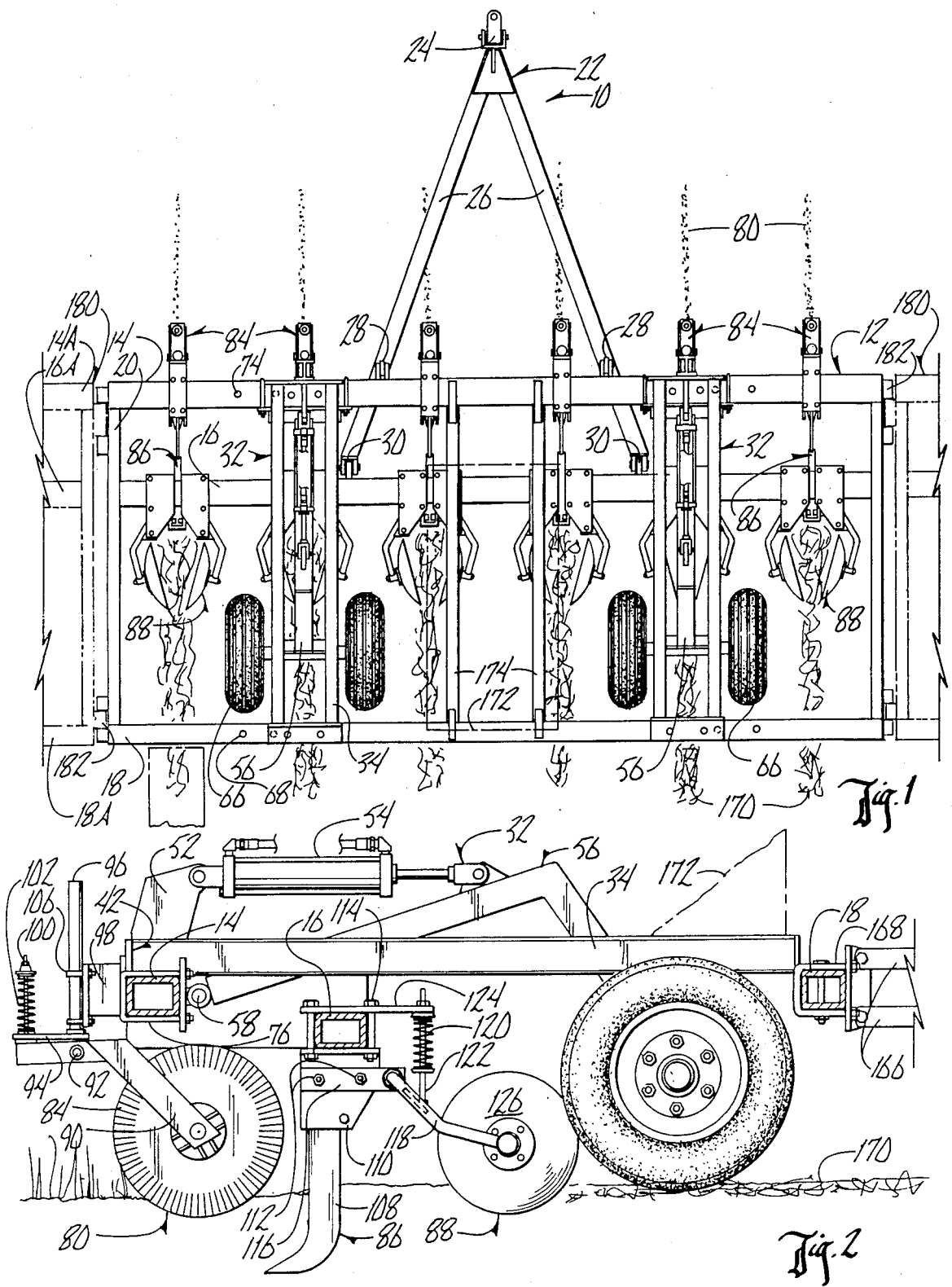

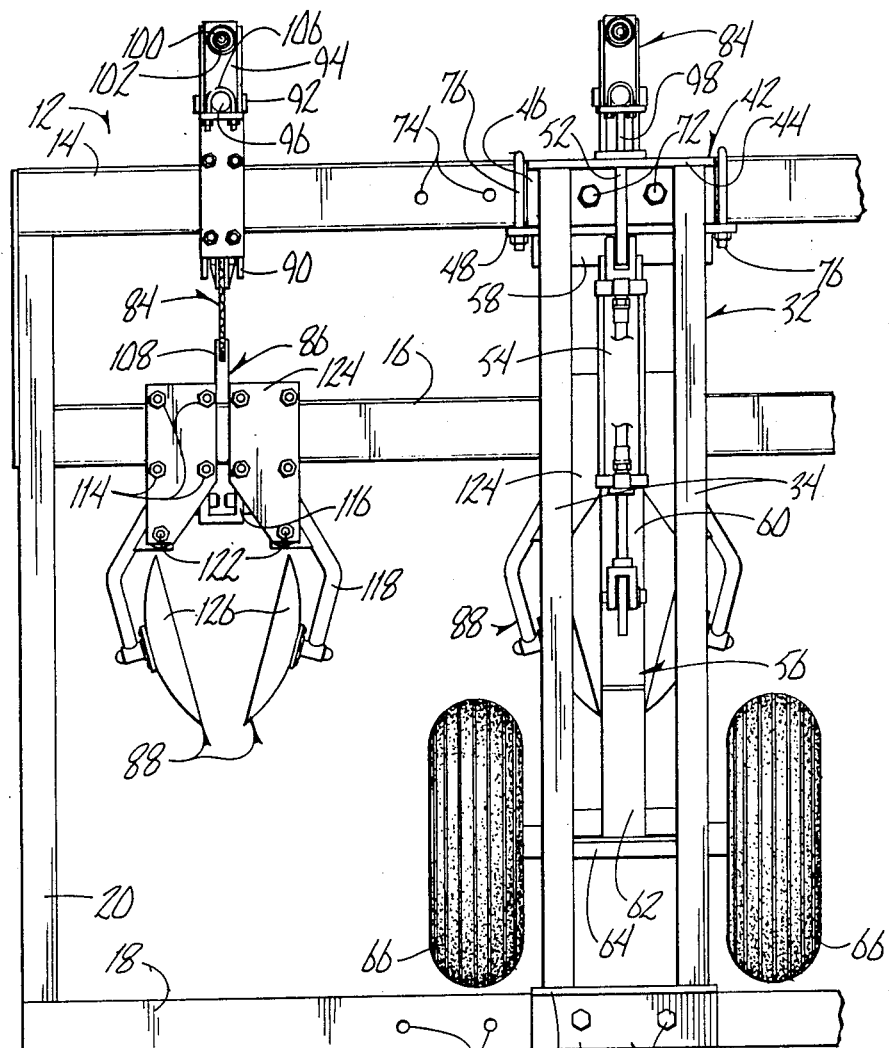
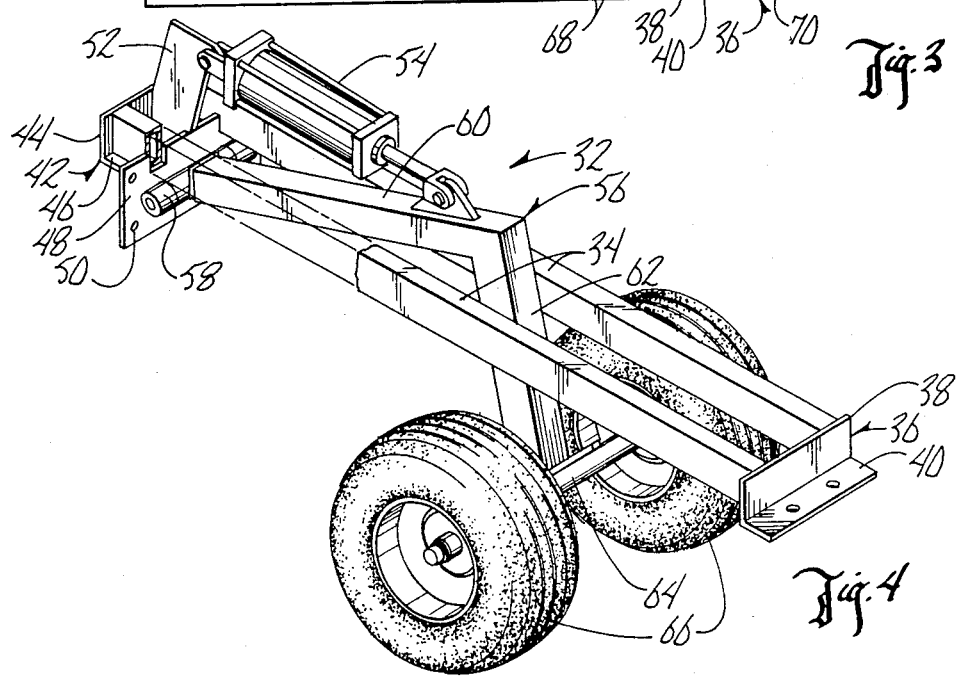
Fig. 3
Fig. 4

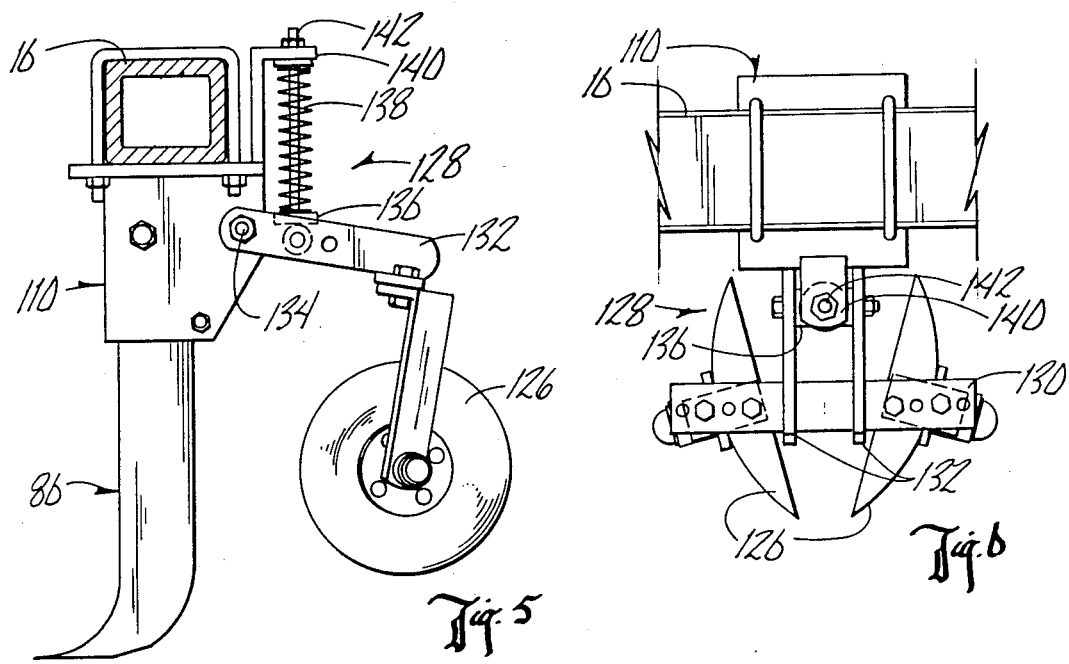
Fig. 5
Fig. 6
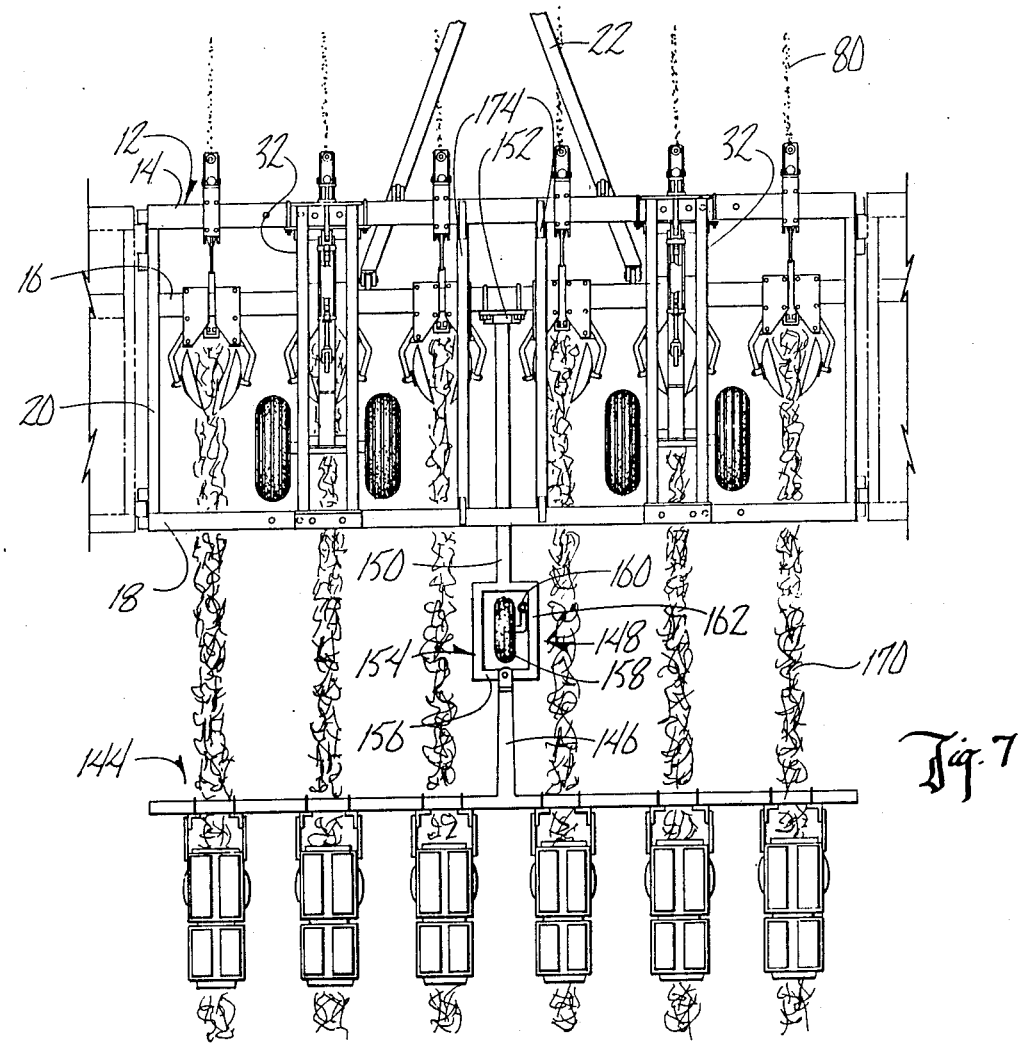
Fig. 7

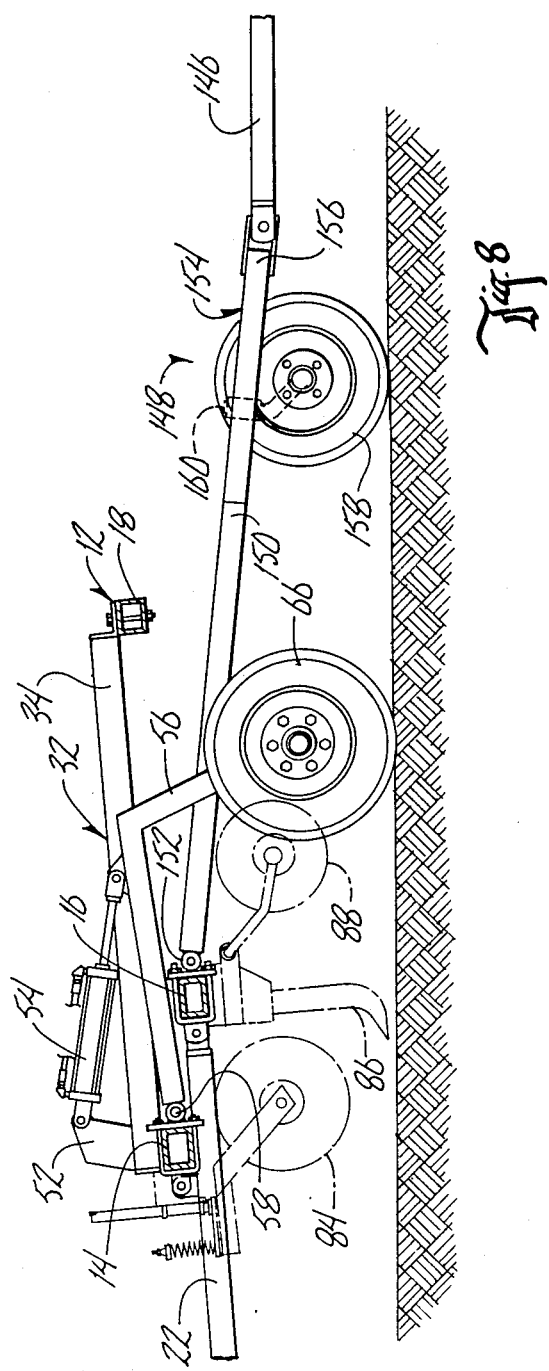

MINIMUM TILLAGE IMPLEMENT

BACKGROUND OF THE INVENTION

The objective of minimum tillage implement designers is to provide a simple but rugged unit that will be economical to purchase and operate. The minimum tillage implement of this invention is believed to satisfy this criteria.

SUMMARY OF THE INVENTION

The minimum tillage implement of this invention includes a rectangular frame connected by a rigid tongue to the drawbar of a tractor. The frame includes front, intermediate and rear tool bars. A coulter is carried on the front tool bar while a subsoil shank and pair of disk hillers are carried on the intermediate bar. A pair of depth gauge and support wheel assemblies are provided and each includes a pair of spaced apart frame members extending between the three tool bars with a ground wheel being carried on a pivot arm positioned between the frame members and pivotally connected to a mounting bracket at the front end which is connected to the front tool bar.

A hydraulic cylinder extends between the front mounting bracket and the pivot arm for pivoting the frame between a raised and lowered position about an axis through the front end of the tongue at its connection to the tractor. A planter tongue pulled behind the implement frame is pivotally connected to a tongue support wheel frame which in turn is connected through a tongue to the intermediate tool bar and extends below the rear tool bar such that the implement frame when being raised and lowered does not interfere with the planter tongue elevation. An alternative planter may be connected directly to the rear bar through parallel linkages.

The ground-working tools for each row are positioned to run along the prior crop row leaving the ground between the rows undisturbed and allowing trash to collect there which in turn will hold moisture in the ground.

The front coulters are 20" in diameter and the subsoil shanks extend approximately 15" into the ground where fertilizer and seed are placed and covered over by disk hillers which create 4 to 5 inch high, 8 to 10 inch wide ridges that reseal the trench which forms the seed bed. The hillers also mix herbicide and insecticide in the ridge top. The ridges warm up quickly and substantially eliminate crusting over the row.

The individual working tools may be readily moved laterally along the tool bars for adjustment purposes for different width rows. The power requirements for pulling the implement approximates 15 h.p. per row.

A fertilizer tank may be carried on the line of travel centerline of the implement resting on a pair of spaced apart tank support frame members extending between the front intermediate and rear tool bars.

The disk hillers may be separately pivotally connected to a mounting bracket carried on the intermediate tool bar and biased individually to a down position by separate spring means or they may be both connected to a common pivot arm spring biased to a down position.

The novel design of the depth gauge and support wheel assembly allows for it to be positioned directly over the coulter, subshank and disk hiller with the ground-support wheels being positioned on either sides of the crop row. The spaced apart frame members rigidify the implement frame structure and resist twisting produced by operation of the hydraulic cylinder used for raising and lowering the implement.

The width of the implement may be increased for additional rows by adding wing sections pivotally connected to either side.

DESCRIPTION OF THE DRAWINGS

FIG. 1 is a top plan view of the minimum tillage implement.

FIG. 2 is a side elevational view thereof.

FIG. 3 is a fragmentary enlarged top plan view.

FIG. 4 is a perspective view of the depth gauge and support wheel assembly.

FIG. 5 is a side elevational view of a subsoil shank and associated alternate disk hiller embodiment.

FIG. 6 is a fragmentary top plan view thereof.

FIG. 7 is a reduced in scale top plan view similar to FIG. 1 but showing a planter connected to a planter tongue support wheel assembly which in turn is connected by a tongue extending under the rear frame tool bar and being connected to the intermediate tool bar.

FIG. 8 is a side elevational view thereof illustrating the implement frame pivoted upwardly to a raised position without interference from the planter tongue support wheel assembly tongue.

DESCRIPTION OF THE PREFERRED EMBODIMENT

The minimum tillage implement of this invention is referred to generally in FIG. 1 by the reference numeral 10 and includes a rectangular closed frame 12 having a front tool bar 14, an intermediate bar 16 and a rear tool bar 18. Opposite side frame members 20 interconnect each of the tool bars 14, 16 and 18.

A V-shaped tongue 22 includes a front end having a clevis 24 for pivotal connection to a tractor (not shown). The rear ends 26 of the legs of the V-shaped tongue 22 are rigidly connected to the front tool bar by brackets 28 and the intermediate tool bar by brackets 30.

In FIG. 4, a depth gauge and support wheel assembly 32 is shown and includes a pair of spaced apart frame members 34 interconnected at their rear ends by a bracket 36 having a vertical plate 38 and a horizontal plate 40. The forward ends of the frame members 34 are also interconnected by a mounting bracket 42 being L-shaped with a vertical leg portion 44 and a horizontal leg portion 46. The left portion 46 extends rearwardly and merges into a vertical plate 48 which has mounting holes 50. An upstanding plate post 52 is positioned between the plate portion 44 and plate 48 and is connected to hydraulic cylinder 54 at one end while the other end is connected to a pivot arm 56 pivotally mounted at 58 on the plate 48. The pivot arm 56 includes a first rearwardly extending member 60 which merges into a second member 62 which extends downwardly and rearwardly and terminates in an axel 64 which carries spaced apart ground wheels 66.

It is seen in FIGS. 2 and 3 that the rear bracket 36 of the depth gauge and support wheel assembly 32 is bolted through holes 68 by bolts 70 to the tool bar 18. The mounting bracket 38 rests on top of the tool bar 18. The front end of the depth gauge and support wheel assembly also rests on top of the front tool bar 14 with the bracket leg 46 engaging the top surface of the bar 14. Mounting bolts 72 extend through selected vertical holes 74 in the tool bar 14. U-bolts 76 extend around the bar 14 and through the holes 50 in the vertical plate 48.

For each previous crop row 80 being worked a series of tools are provided on the implement frame 12 and include a front coulter 84, a subsoil shank 86 and a disk hiller 88. Each of these tools are aligned front to rear on the previous crop row 80.

The coulter 84 is carried on an arm 90 pivotally connected at 92 to a bracket 94 carried on a post 96 in turn adjustably mounted on a bracket 98 connected to the front bar 14. A bolt 100 extends upwardly from the forward end of the bracket 90 through the bracket 94 and through a coil spring 102 to spring bias the coulter 84 to a down position but yet allow for it to pivot upwardly when obstacles are hit. U-bolts 106 adjustably clamp the post 96 to the bracket 98.

The subsoil shank 86 includes a blade 108 clamped between a pair of L-shaped brackets 110 in turn bolted to the bottom side of the intermediate tool bar 16 with bolts 112 extending horizontally and bolts 114 extending vertically through the bracket legs. The disk hiller includes oppositely disposed side brackets 116 on either side of the L-shaped bracket 110 which are held in place by the bolts 112. As seen in FIG. 3, a pair of independently pivotal arms 118 are connected to the rear ends of the brackets 116 for independent pivotal action against a spring 120 carried on a bolt 122 extending between the arms and a top tracket 124. Disk plates 126 are carried on the rear ends of the arms 118.

It is seen that the depth gauge and support wheel assembly 32 is positioned directly over the coulter 84, subsoil shank 86 and disk hiller 88 and also straddles the crop row 80 being worked. The wheels 66 are disposed between the rows.

In FIGS. 5 and 6 an alternate disk hiller 128 is illustrated and differs from that shown in FIGS. 2 and 3 by the fact that the blades 126 are carried on a common laterally extending member 130 which in turn is carried by a pair of rigid arms 132 which are pivotally connected by a bolt 134 to the subsoil shank L-shaped bracket 110. A plate element 136 extends between the arms 132 and supports a spring 138 which is positioned under a bracket 140 and is carried on a bolt 142 and biases the arms 132 downwardly.

In FIGS. 7 and 8 a planter 144 having a tongue 146 is connected to a planter tongue support wheel assembly 148 which in turn is connected through a tongue 150 pivotally to the intermediate tool bar 16 by a pivot bracket 152. The planter tongue support wheel assembly includes a rectangular frame 154 to which the planter tongue 146 is connected along the rear frame member 156. A wheel 158 is connected by an arm 160 to a side frame member 162. It is thus seen in FIG. 8 that when the implement frame 12 is pivoted upwardly to the raised position it is free and clear of the planter tongue support wheel assembly tongue 150 which extends under the rear tool bar 18. Furthermore, since the tongue 150 is connected substantially forwardly along the implement frame 12 to the intermediate tool bar 16 there is very little upward movement to the tongue 150 thus maintaining the planter 144 at a substantially constant elevation at all times.

In FIG. 2 a pair of parallel linkages 166 are secured by U-bolts 168 to the rear tool bar 18 at their forward ends and are connected to a planter (not shown) at their rearward ends. This hitch is suitable for a mounted type planter as opposed to the pull type planter 144 of FIGS. 7 and 8.

In operation it is seen that the individual tools may be separately, easily and quickly moved along their associated tool bars to work any given row spacing. The soil is disrupted a minimum amount by the coulter 84 which cuts the stalks on the row line thereby preventing debris gathering around the subsoil shank 86 which cuts a groove through the soil. The disk hiller 88 helps to form a ridge and close the groove formed by the subsoil shank 86. The planter units may now easily penetrate the worked ridge of soil 170. Fertilizer and insecticide may be placed also into the groove. A fertilizer-chemical tank 172 is shown by dash lines in FIG. 2 and is carried on a pair of spaced apart tank support members 174 extending between the tool bars 14, 16 and 18. The tank is positioned on the centerline of travel of the implement.

The width of the minimum tillage implement 10 may be increased by wing sections 180 connected by hinges 182 to the side frame members 20. The wing sections 180 will have a corresponding forward tool bar 14A and an intermediate tool bar 16A and a rear tool bar 18A. Ground-working tools similar to that carried on the main frame 12 will be included on the wing sections 180 for however many rows are to be worked.

What is claimed is:

1. A minimum tillage implement comprising,
    a rectangular closed frame including front and rear tool bars and an intermediate tool bar adjacent said front tool bar and remote to said rear tool bar,
    a coulter connected to said front tool bar and a subsoil shank connected to said intermediate tool bar,
    a disk hiller positioned behind said subsoil shank and connected to said intermediate tool bar, and
    a depth gauge and support wheel assembly including a pair of spaced apart frame members extending between and connected to said front and rear tool bars, a pivot arm pivotally connected at one end between said pair of frame members at said front tool bar, and said arm including a ground wheel at the other end opposite said pivot end, a hydraulic power cylinder connected between the front end of said assembly and said pivot arm to raise and lower said implement.

2. The structure of claim 1 wherein the rear tool bar is positioned rearwardly of said ground wheel.

3. The structure of claim 1 wherein a tongue assembly is rigidly connected at its rear and to said front and intermediate tool bars and includes a front end adapted to be pivotally connected to a prime mover whereby actuation of said hydraulic cylinder pivots said implement about an axis through the front end of said tongue.

4. The structure of claim 1 wherein said wheel assembly further includes a front bracket interconnecting said pair of frame members and an upstanding post is positioned on said bracket and said hydraulic cylinder is connected to the upper end of said post.

5. The structure of claim 4 wherein said front bracket further includes a horizontal plate and a rearwardly disposed adjacent vertical plate connected between said pair of frame members, said horizontal plate is positioned on top of said front tool bar and said vertical plate is positioned on the rear side of said front tool bar and fastening means connects each of said plates to said front tool bar.

6. The structure of claim 5 wherein said pivot end of said arm is pivotally connected to said vertical plate.

7. The structure of claim 6 wherein said rear ends of said pair of frame members are interconnected by a bracket and fastener means connects said bracket to said rear tool bar.

8. The structure of claim 7 wherein said pivot arm includes a first member extending rearwardly from said pivot connection and merging into a second member extending downwardly and rearwardly and terminating at said ground wheel.

9. The structure of claim 1 wherein a planter is positioned behind said implement frame and includes a tongue operatively connected to said intermediate tool bar and said tongue extends freely under said rear tool bar whereby said implement frame when pivoted upwardly raises the rear tool bar without substantially raising said planter tongue.

10. The structure of claim 9 wherein a planter tongue support wheel assembly is connected between said implement and said planter.

11. The structure of claim 10 wherein said planter tongue support wheel assembly includes a tongue connected to said intermediate tool bar and extends under said rear tool bar rearwardly terminating in a ground wheel, said planter tongue is pivotally connected to said support wheel assembly at said ground wheel whereby said planter tongue remains at a substantially constant elevation as said implement is moved upwardly and downwardly.

12. The structure of claim 11 wherein said support wheel tongue includes a closed frame extending around said support wheel and said planter tongue is connected to the rear side of said closed frame.

13. The structure of claim 1 wherein said coulter, subsoil shank and said disk hiller are aligned and positioned on said implement frame to move directly on the previous crop row without working the ground between previous crop rows.

14. The structure of claim 9 wherein said coulter, subsoil shank, disk hiller and planter are positioned on said implement frame to move directly on the previous crop row without working the ground between previous crop rows.

15. The structure of claim 1 wherein a planter is connected to said implement frame by a pair of parallel linkages vertically arranged extending between the planter and the rear tool bar.

16. The structure of claim 1 wherein said implement frame includes oppositely disposed wing sections connected to oppositely disposed side frame members extending between and connected to said front, intermediate and rear tool bars, and said wing sections each include at least one row of ground-working tools.

17. The structure of claim 13 wherein said depth gauge and support wheel assembly are vertically aligned with said coulter, subsoil shank and disk hiller with said pair of frame members and pivot arms extending thereabove.

18. The structure of claim 1 wherein said disk hiller includes a pair of laterally spaced apart disk blades each having separate pivot arms connected to a mounting bracket on said intermediate tool bar, and spring means operatively extend between said bracket and each of said pivot arms to yieldably maintain said disks in a down position.

19. The structure of claim 1 wherein said disk hiller includes a pair of laterally spaced apart disk blades carried on a common pivot arm connected to a mounting bracket on said intermediate tool bar, and a spring means operatively extends between said bracket and said pivot arm to yieldably maintain said disks in a down position.

20. The structure of claim 1 wherein a pair of tank support frame members extend between the front tool bar, intermediate bar, and rear bar and are spaced apart on opposite sides of the line of travel centerline of the implement and a fertilizer tank is positioned on said tank support frame members.

* * * * *